J. T. ALLMAND.
WINDSHIELD WIPER.
APPLICATION FILED OCT. 20, 1919.
1,388,911.
Patented Aug. 30, 1921.
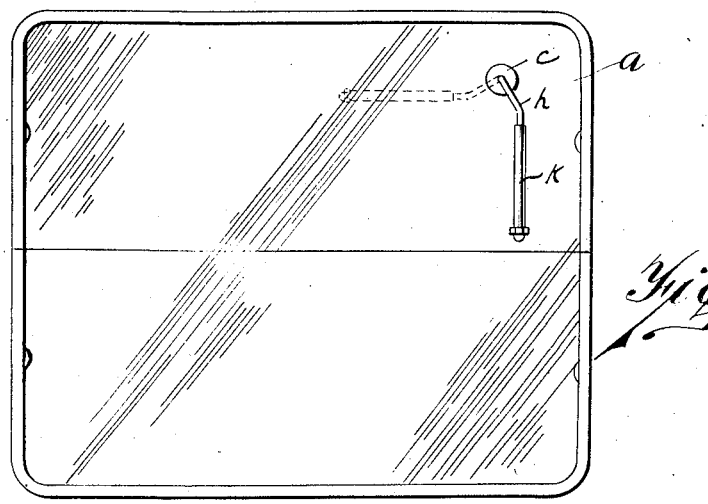
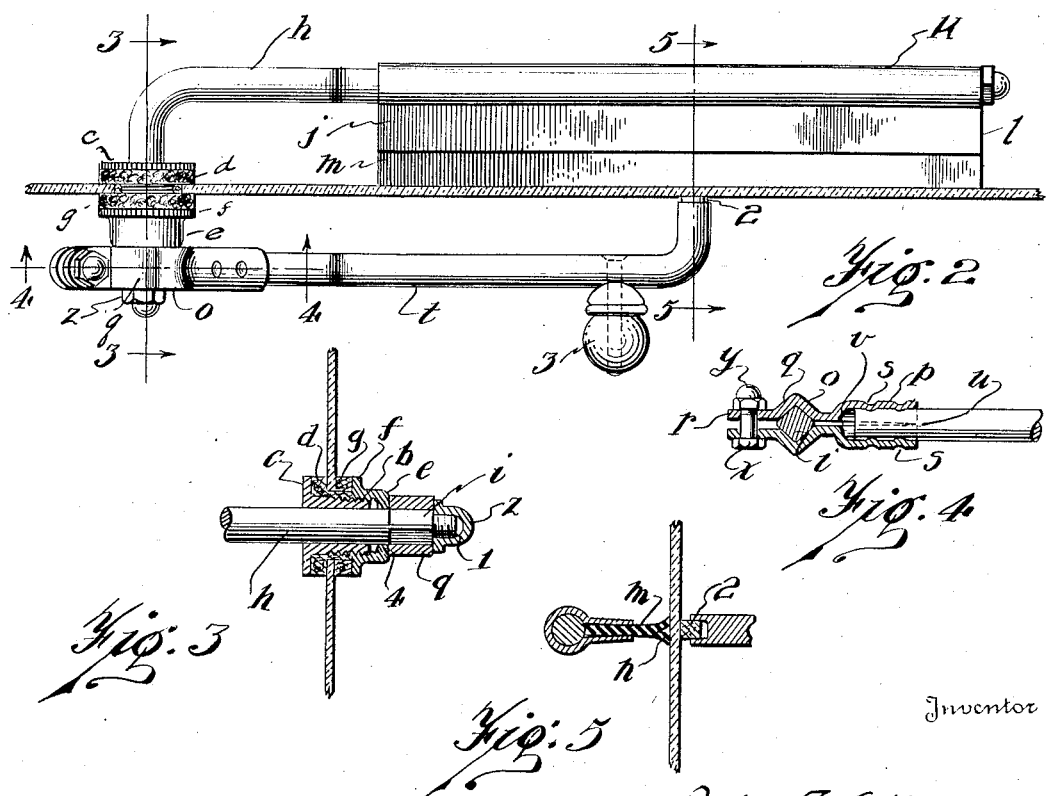

UNITED STATES PATENT OFFICE.

JOHN T. ALLMAND, OF DETROIT, MICHIGAN, ASSIGNOR TO TERNSTEDT MANUFACTURING COMPANY, OF DETROIT, MICHIGAN, A CORPORATION OF MICHIGAN.

WINDSHIELD-WIPER.

1,388,911.     Specification of Letters Patent.     Patented Aug. 30, 1921.

Application filed October 20, 1919. Serial No. 331,875.

*To all whom it may concern:*

Be it known that I, JOHN T. ALLMAND, a citizen of the United States, residing at Detroit, in the county of Wayne and State of Michigan, have invented certain new and useful Improvements in Windshield-Wipers, of which the following is a specification.

This invention relates to windshield wipers, and has for its object a windshield wiper of special construction to afford a device of this character which is both efficient in operation and can be produced in large quantities cheaply.

In the drawings,—

Figure 1 shows the wiper attached to the windshield glass.

Fig. 2 is a section through the windshield glass showing the wiper.

Fig. 3 is a section taken on the line 3—3 of Fig. 2.

Fig. 4 is a section taken on the line 4—4 of Fig. 2.

Fig. 5 is a section taken on the line 5—5 of Fig. 2.

$a$ designates the upper panel of the windshield. Through the glass is bored a hole through which is adapted to pass the externally-threaded sleeve $b$ provided with a flange $c$ adapted to crowd the felt packing $d$ up against the glass. Running on the threads at the opposite sides is a combined nut and hub $e$ having a flange $f$ adapted to crowd the felt packing ring $g$ against this side of the glass. This sleeve $c$ and hub 4 form a bearing for the rod $h$ to turn in. The outer end of this rod is squared as at $i$, while the other end of the rod is bent parallel with the glass and runs through the tubular back of the wiper holder $j$. This holder $j$ is a strip of metal folded upon itself to form the tubular back portion $k$ and the clamp $l$ between which is pinched a flexible rubber strip $m$ which has its outer edge grooved to form a relatively pliable pair of edges $n$ (see Fig. 5).

On the squared end of the rod $h$ fits a special form of clamp $o$ detailed in Fig. 4. This clamp comprises an upper and lower jaw complementary to each other and each jaw having a half tube portion $p$, a V or jaw portion $q$ adapted to fit over substantially half of the squared rod $h$, and a perforated lug $r$. The half sleeve portion is spot-welded at the points $s$ to the end of the lever rod $t$. These two sleeve portions are cut so that they come together only at the inner ends as at $u$, while there is a tapering gap $v$ that gradually enlarges toward the outer end. This allows the V or jaw portions $q$ of the clamp to be tightened upon the squared end $i$ of the rod simply by the action of a cap screw $x$ and a blind nut $y$. The V portions $q$ and the perforated lugs $r$ form spring arms which may be clamped on the squared end of the rod along the squared portions $i$ (see Fig. 3).

The rod $h$ is movable in the bearing formed by the sleeve and nut hub. Hence when the sleeve and nut hub have been secured upon the glass, the rod $h$ and the lever rod $t$ are movable slightly. The contact end 2 of the lever arm $t$ is brought against the glass. The rod $h$ is then pushed toward the glass slightly, flexing the rubber wiper $n$ until the amount of flexure desired is secured for the rubber wiper. Thereupon the cap screw and the blind nut may be turned to tighten the clamp firmly upon the squared portion. This insures the pressure of the wiper upon the glass. The maintenance of the clamp in position is assisted by the cap nut $z$ on the threaded end of the rod $h$. This acts as an abutment to prevent the clamp from moving outwardly on the squared portion.

The lever rod $t$ curves in toward the glass and carries a contact piece 2, which is simply a leather plug crowded into a bore in the end of the lever rod $t$. The lever rod $t$ is provided with a knob 3 that is riveted loosely thereupon so that it can turn on the rivet. This serves to actuate the lever arm.

What I claim is:

1. An assembly for the purpose specified, having in combination, a rod, means for journaling and supporting the rod, the end of the rod being fashioned into a polygon, a lever arm having at one end in alinement with the rod portion a tubular clamp having a pair of half portions each permanently secured to the lever arm and the two provided with a transverse polygonal opening adapted to fit over the polygonal end of the rod, and tightening devices passing through the end of the half portions of the tubular clamp to engage the same upon the polygonal portion of the rod.

2. An assembly for the purpose specified, comprising a rod having a bearing portion, means rotatably supporting the last-mentioned portion of the rod, the end of the rod being polygonal and having its extreme end screw-threaded, a lever arm having at one end a permanently attached clamp in the form of a pair of half tubes each secured permanently to the lever arm, means for drawing the free end of the clamp portions toward each other upon the polygonal portion of the rod, and a nut engaging the threads on the end of the rod for holding the clamp in position.

3. An assembly for the purpose specified, comprising a rod having a bearing portion, means for rotatably supporting the bearing portion, and a lever arm provided at one end with a pair of clamp jaws formed at one end of half tubes welded to the end of the lever rod and having V or jaw portions adapted to embrace the end of the rod, and means for drawing said split portions together to clamp the same to the said rod end.

In testimony whereof I affix my signature.

JOHN T. ALLMAND.